J. W. POWELL.
Improvement in Electro-Magnetic Machines.
No. 115,518.            Patented May 30, 1871.

Witnesses.
H. H. Young
T. H. Opperman.

James W. Powell M. D.
Inventor
By David A. Burr
Atty.

115,518

UNITED STATES PATENT OFFICE.

JAMES W. POWELL, OF NEW YORK, N. Y.

IMPROVEMENT IN ELECTRO-MAGNETIC MACHINES.

Specification forming part of Letters Patent No. 115,518, dated May 30, 1871.

I, JAMES W. POWELL, of the city, county, and State of New York, have invented certain Improvements in Faradic or Electro-Magnetic Machines, of which the following is a specification:

Nature and Objects of the Invention.

The first part of my invention relates to the combination of a scale with the movable coil encircling the magnet of an electro-magnetic machine, to enable the practitioner to make a record of the intensity of the current applied to his patient at each *séance*, and to make a record, also, of the intensity of either the primary or secondary currents employed. The second part of my invention relates to the combination of a metallic collar or capping, and a packing of India rubber or other equivalent elastic material with the battery-cell of an electro-magnet machine; the object of this part of my invention being to construct a machine which shall be very portable, and may be removed from place to place without escape or splashing or spilling of the battery fluid over the top of the cell, when it is charged and ready for instant use.

Description of the Accompanying Drawing.

Figure 1:
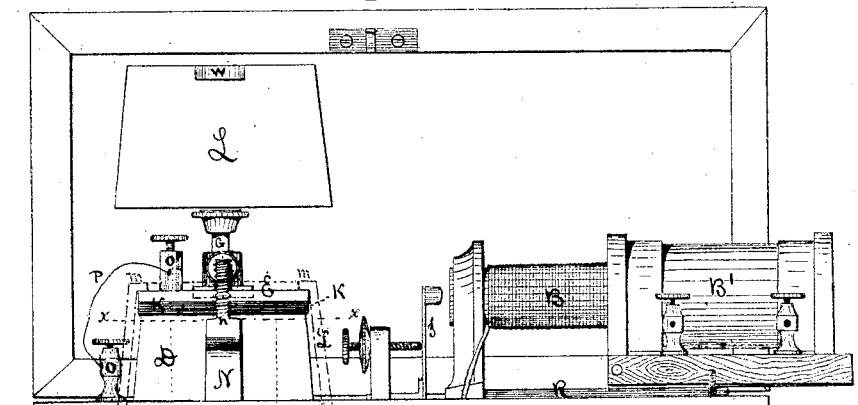
Figure 3:
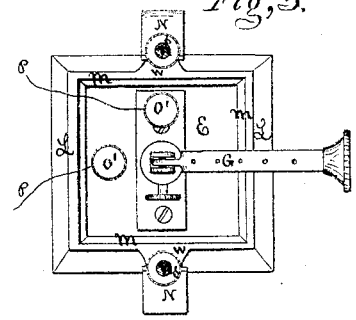
Figure 2:
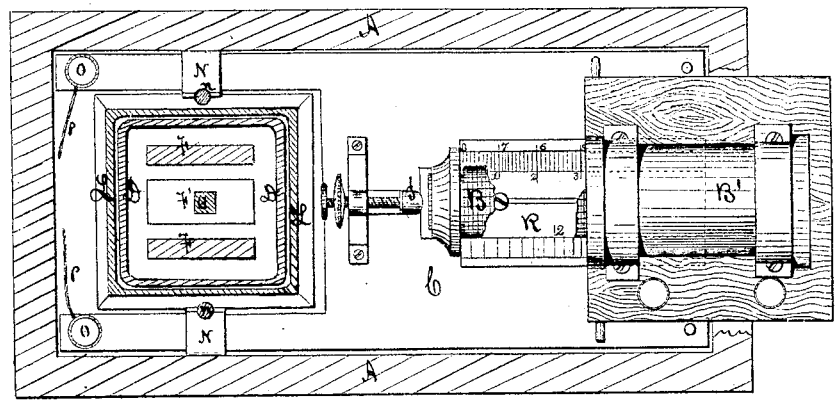

Figure 1 is an elevation of a Faradic or electro-magnetic machine with the cover of its inclosing box or case thrown open, and the collar or capping for the battery-cell lifted and removed therefrom. Fig. 2 is a top or plan view of the machine, the battery-cell, however, being illustrated by a transverse horizontal section taken in the line *x x* of Fig. 1, and the stationary coil of the magnet partly broken away to illustrate the combination of a scale with the magnet. The cover of the case is shown as closed and in section. Fig. 3 is a top view of the battery-cell detached from the remainder of the machine, illustrating the same, with its collar or capping secured in place thereon.

General Description.

A is the case inclosing my improved electro-magnetic machine, which, in its general features, is constructed in the customary manner, B being the stationary coil of its electro-magnet, arranged as usual upon a bed-plate, C; and B', the movable encircling-coil, which, by sliding outward, increases the intensity of the primary current, and sliding inward increases the intensity of the secondary current. D is the battery cup or cell of the machine. E, an insulating cap-plate, by preference of hard rubber, made to cover the top of the cell and support the battery-plates. F F F' are the battery-plates; the two outer ones, F F, of carbon, being secured to the covering-plate E, and the center one, F', of zinc, secured to a movable jointed rod, G, passing centrally through the covering-plate E and through a sleeve, H, secured thereto. I is the spring-armature of the magnet. K is a plate or sheet of rubber or other equivalent elastic packing material capable of resisting the effects of acid, and secured over the lower face of the cap-plate E of the battery, so as to bear upon the edges of the cup or cell D, and also encircle and bind closely upon the rod G passing through the cap-plate E, to pack and make water-tight the joint of the cap-plate with the cell and with the rod G. To insure a more complete packing of this latter joint when the rod and its attached zinc plate are raised, an elastic washer may be super-added to the elastic lining K, or placed upon the top of the zinc plate about the end of the rod G, secured thereto; and to attain the same end in reference to the joint between the top of the cell and its cover an elastic band may be fitted around the rim of the cell to overlap its top edges. I contemplate, in fact, a substitution of the washer and band for the lining sheet or plate K, as an equivalent therefor. L is a metallic collar or capping, fitting down over the upper end or neck of the cup or cell B, and provided with a flange, *m*, projecting inwardly from its upper rim to overlap the edges of the cap-plate E, covering the cell. (See Fig. 3 and dotted lines in Fig. 1.) N N are short standards or metallic strips projecting upward from the case of the machine, or from the cell B, on opposite sides of the latter, terminating in threaded pins or screws *n n*, which, passing through apertures in lugs or ears *w w*, projecting outwardly from the upper end of the collar or capping L, (see Fig. 3,) receive nuts *s s*, which serve to bear down and fasten said capping very firmly upon the cover or cap-plate E of the cell, as shown in Fig. 3. O O and O' O' are the binding-posts, and P P the wires for connecting the battery with the instrument. R is a scale of any desired system of units, engraved or imprinted upon a suitable plate secured upon the bed-plate C, immediately under the stationary coil B of the magnet, in such manner as that the sliding coil B' shall move over it. This scale R is graduated both ways, the figures from left to right serving to indicate the degree of intensity obtained or used with the primary current, and the figures from right to left serving to indicate the intensity of the secondary (or stronger) current when it is in use. A screw-clamp may be substituted for the collar L and nuts $s\ s$, to press and close the cap-plate E down upon the top of the cell B; and, in fact, I contemplate the use of any of the well-known equivalent mechanical devices for the purpose.

When the battery is excited in the usual manner, by the immersion of the zinc plate into the fluid of the cell through the instrumentality of the rod G, and the machine is in operation, the practitioner is enabled, by means of the figures running from left to right on the scale R, to note the amount or degree of intensity obtained in the primary current in sliding out the movable coil; and in like manner, when the secondary current is in action, he is enabled to note with precision the amount of current obtained or used by observing the figures from right to left as the sliding coil moves inward. When the machine is not in operation the battery-rod G is drawn up and turned over, as illustrated in Fig. 3. The elastic lining K of the cap plate E, covering the cell B, being compressed tightly upon the edges of the cell by the flange $m$ of the capping L, screwed down thereon by the nuts $s\ s$ working on the strips or standards N N, prevents, in combination with its packing of the joint of the movable rod G, as it passes through the cap-plate, any escape or leakage of the battery fluid from the cell, even when the machine is shaken and jostled by being carried from place to place. The machine is thus rendered entirely portable, even when charged and ready for immediate use.

Claims.

I claim as my invention—

1. A scale, R, in combination with the movable and stationary coils B B' of an electro-magnet, substantially as and for the purpose herein set forth.

2. An elastic lining or washer, K, in combination with the rim or edge of the battery cup or cell D of an electro-magnetic machine, and with a cap-plate, E, secured thereon, substantially in the manner and for the purpose herein set forth.

JAMES W. POWELL.

Witnesses:
JOHN IVES,
C. E. TUTHILL.